March 6, 1934.  E. A. ROCKWELL  1,949,627
VACUUM GAUGE
Filed June 19, 1931

INVENTOR
EDWARD A. ROCKWELL.
BY
ATTORNEY

Patented Mar. 6, 1934

1,949,627

UNITED STATES PATENT OFFICE 1,949,627

VACUUM GAUGE

Edward A. Rockwell, Chicago, Ill., assignor to Patent Engineering Corporation, New York, N. Y., a corporation of Delaware Application June 19, 1931, Serial No. 545,383

4 Claims. (Cl. 73—31)

This invention relates to instruments such as vacuum gauges of the liquid column type, and more particularly to such instruments for use with liquid level indicators of the type described in the application for patent, Serial Number 542,884, filed June 8, 1931.

An object of the invention is to provide a gauge of simple and cheap construction and having few parts.

Another object is to provide a gauge adapted to be easily mounted, as for instance upon the instrument board of an automobile so as to be readily viewed by the driver.

A further object is to provide a gauge that is self-contained together with its associated scale and coupling or pipe line connection and which constitutes a complete unit assembly ready for use.

Other objects will be apparent from the following description where, by way of illustration, the invention is described as constructed for use with a liquid level indicator as described in the application for patent aforesaid.

Obviously the gauge can be used for any purpose for which it is suitable, and many modifications can be made in the construction herein shown and described, without avoiding the appended claims.

Figure 4:
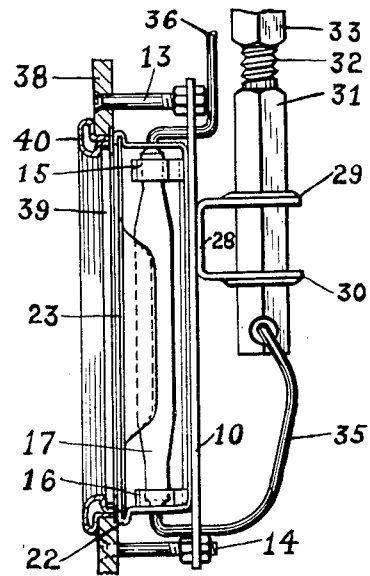
Figure 3:
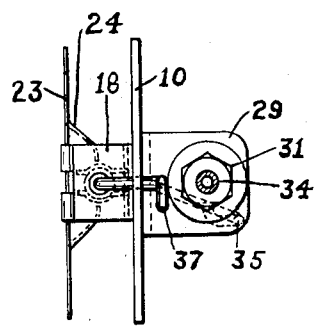
Figure 1:
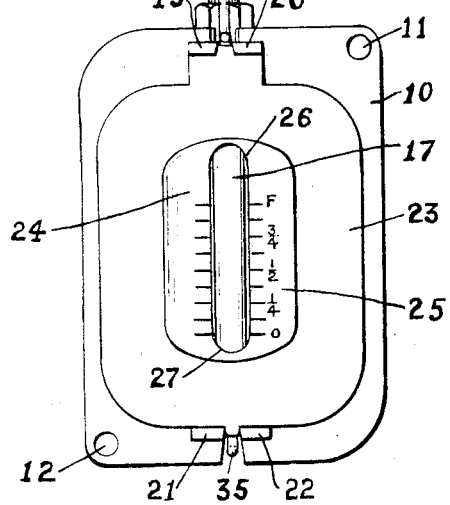
Figure 2:
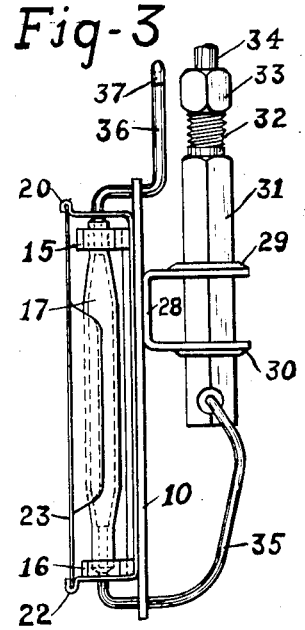

In the accompanying drawing:

Figure 1 is a front view of the gauge;
Figure 2 is a side view of the gauge, Figure 1;
Figure 3 is a top view of the gauge, Figure 1, and
Figure 4 is a side view of the gauge, Figure 1, mounted upon the instrument board (partly shown in section) of an automobile.

The numeral 10 denotes the main frame of the gauge supporting all of the parts thereof and forming therewith a complete unit ready for mounting. This frame is preferably a stamping of iron or brass having therein apertures 11, 12 for bolts or screws and nuts 13, 14 whereby the unit may be mounted in place.

Secured to the frame 10 and/or support 18 in any suitable manner, such as by soldering, welding or riveting, are the U clips 15, 16, preferably of spring brass or phosphor bronze adapted to hold the transparent tube 17 preferably of glass and forming a container for a portion of the indicating liquid in the gauge.

The tube 17 is preferably formed as shown in the drawing, the ends of same being somewhat smaller than the center portion thereof, although it is evident a straight tube may be used. The ends of the tube may be wrapped with felt or covered with a suitable cement, and are snapped in place in the clips 15, 16, thus positioning the center portion of the tube in proper relation to a graduated scale member to be presently described. The scale markings can if desired be formed on the tube 17.

Also secured to the frame 10 in any suitable manner is the support 18 of sheet metal somewhat smaller than frame 10 and having the projecting fingers 19, 20, 21, 22 formed as shown in Figure 2 to hold the graduated scale member 23 preferably made of metal. The center portion of this member is formed as shown at 24 in Figure 1 and is preferably enameled white and has the scale or graduations indicated at 25 marked thereon in any suitable manner. The fingers or ears 19, 20, 21, 22 of the support 18 are bent over the face of the scale member which is firmly held against tube 17 thereby, a slot, the ends of which are shown at 26, 27, being provided for the tube. The tube 17 and scale 25 are therefore securely positioned in respect to each other and need no relative adjustment when mounting the gauge for use.

Obviously instead of mounting the U clips 15, 16 directly upon the frame 10, they can be mounted on the support 18, it being immaterial as to what form of mounting is adopted provided the tube 17 and its associated scale are maintained in fixed relationship. The arrangements herein shown and described are however simple and cheap to construct. Mounted on frame 10 and secured thereto in any suitable manner is the member 28 having two ears or lugs 29, 30 in which is secured by suitable means the hollow member 31 preferably of metal and threaded as shown at 32 to receive the usual nut 33 for securing the pipe or tube 34 thereto.

The member 31 may be a piece of hexagonal brass tubing as shown having a hole extending from the top nearly to the bottom thereof and connecting with a cross hole in which is soldered one end of a tube 35, the other end thereof being cemented to the lower end of the glass tube 17.

The hole previously referred to in the member 31 forms a chamber therein of greater capacity than the bore of tube 17 and adapted to hold liquid drawn from said tube as presently described.

Secured to the top of the tube 17 is a piece of tubing 36 forming an overflow chamber which rises a sufficient distance above the glass tube 17 to provide an overflow of liquid forced from tube 17 as presently described. The tube 36 may have its outer end 37 turned downwards as shown in Figure 1. This tube 36 is bent away from the face of the gauge as shown in Figure 2, so as to bring the upper portion of the tube behind the instrument board 38, thereby permitting the gauge glass 17 to be brought forward to the outer surface of the board to a greater extent than if the tube 36 extended straight up from tube 17. If it were not for this requirement tube 36 could be merely a prolongation or extension of tube 17.

The tube 17 is filled with any suitable liquid— preferably colored red and of a specific gravity depending upon the purpose for which the gauge is used—until the liquid stands at the mark "F" on the scale 25. The tubes 17 and 35 and a portion of 31 now form a manometer tube. The tube 37 and chamber 31 are temporarily capped and the gauge is ready for connection to the other equipment used therewith.

The gauge may now be placed on an instrument board 38 in which there is provided a glass 39 and bezel 40, being mounted thereon as shown in Figure 4 with the flat portion of the scale member 23 fitting neatly with the glass 39. Obviously the gauge unit can be attached to and removed from the instrument board without removing the glass 39 or the bezel 40, which removal and replacement often entails broken glasses and a marring of the finish of the bezel and front of the board.

The screws 13, 14 can be studs secured to the back of the board and the gauge unit secured thereto by nuts.

Assuming that the gauge is to be used in a liquid level indicating system as described in the patent application previously mentioned herein, the pipe 34 connects to a tank unit having a chamber in which a degree of sub-atmospheric pressure exists dependent upon the height of liquid in the tank. But in putting the gauge in operation, there is a period where air is trapped in the pipe 34 and forced into the gauge tube 17. Heretofore this has caused trouble for the liquid in the gauge is forced out of tube 17 and overflowing the top thereof is lost. By the present invention this condition is remedied by the provision of the overflow chamber formed by the tube 36 which is so proportioned in respect to its capacity as to provide the necessary overflow space for the liquid in the gauge tube 17 in the event pressure entering therein is sufficient to force liquid therefrom. As the amount of pressure that occurs can be determined for each installation, the overflow chamber 36 can be proportioned accordingly.

Assuming that the gauge has been installed and that sub-atmospheric pressure only exists in the tube 34, the liquid in tube 17 will be drawn downwards and scale 25 being properly marked will read in proportion. In order to insure in case of abnormal vacuum that the liquid will not be sucked into tube 34 and thereby leave the gauge, the member 31 is provided which may be proportioned according to conditions of use to hold any amount of liquid that may be withdrawn from tube 17.

Therefore, by providing the members 31 and 36, the gauge is protected against both excessive pressure and vacuum.

It will be understood that when the gauge is in use, the end 37 of tube 36 is open to the atmosphere.

This invention is not limited to the specific structure shown as it is evident to those skilled in the art that support 18 and member 28 can be dispensed with and that ears 19, 20, 21, 22 and lugs 29, 30 could be formed integral with frame 10.

It will be observed that the gauge as herein shown and described together with the coupling or nut 33 forms a complete unit that is adapted to be mounted for use, and that none of the parts thereof require adjustment when installing the unit, which is complete in itself and therefore may be mounted by merely placing it in position on the screws or bolts 13, 14 or by supporting it in any other suitable manner.

What is claimed is:

1. An instrument comprising a frame, a support secured thereto, clips secured to said support, a tube supported in said clips, a scale member secured to said support, and members constituting overflow chambers connected to the ends of said tube.

2. An instrument comprising a supporting frame having projecting ears, a gauge tube supported on said frame, a scale member secured to said frame and positioned between the ears thereon, said scale member having a portion extending toward said tube and embracing the same, and a member forming a chamber mounted on the rear surface of said frame and supported thereby.

3. A gauge comprising a main frame, a pair of U clips secured to said frame, a transparent tube mounted in said clips, a scale member mounted adjacent said tube and secured to said frame, a member forming a chamber secured to the upper end of said tube and extending rearwardly therefrom and then upwardly to provide an overflow space for liquid from said tube, and a second member forming a chamber connected to the bottom of said tube and supported on said main frame, all of the foregoing forming a unit adapted to be mounted for use.

4. A gauge as claimed in claim 3 having a main frame, supports formed integral with said frame and projecting rearwardly therefrom to support a member forming a chamber.

EDWARD A. ROCKWELL.